United States Patent [19]

Lallemand

[11] 4,224,603
[45] Sep. 23, 1980

[54] DEVICE FOR LOCATING THE POSITION OF A MOVABLE COMPONENT AND ESPECIALLY A VALUE-SETTING COMPONENT IN A FRANKING MACHINE

[75] Inventor: Jacques Lallemand, Paris, France

[73] Assignee: Societe d'Etude et de Construction d'Appareils de Precision (S.E.C.A.P.), Boulogne-Billancourt, France

[21] Appl. No.: 803,660

[22] Filed: Jun. 6, 1977

[30] Foreign Application Priority Data

Jun. 9, 1976 [FR] France .................................. 76 17329

[51] Int. Cl.² ............................................ H03K 13/02
[52] U.S. Cl. ........................ 340/347 P; 250/231 SE; 340/347 M; 371/52

[58] Field of Search ....... 340/347 M, 347 P, 347 AD, 340/146.1 AB, 146.1 A; 235/92 MP, 101, 432; 250/231 SE; 364/466, 464

[56] References Cited

U.S. PATENT DOCUMENTS

| | | | |
|---|---|---|---|
| 3,141,150 | 7/1964 | Vancsa et al. | 340/146.1 AB |
| 3,451,053 | 6/1969 | Xenis et al. | 340/347 P |
| 4,025,914 | 5/1977 | Akita | 340/347 P |
| 4,090,063 | 5/1978 | Martin | 235/92 MP X |

Primary Examiner—Thomas J. Sloyan
Attorney, Agent, or Firm—McDougall, Hersh & Scott

[57] ABSTRACT

A franking machine having a locating operation applied to one out of ten distinct positions of value setting components, with five transducers provided for delivery of 5-bit coded activation information zones which makes it possible to check the accuracy of the information collected by the transducer.

1 Claim, 6 Drawing Figures

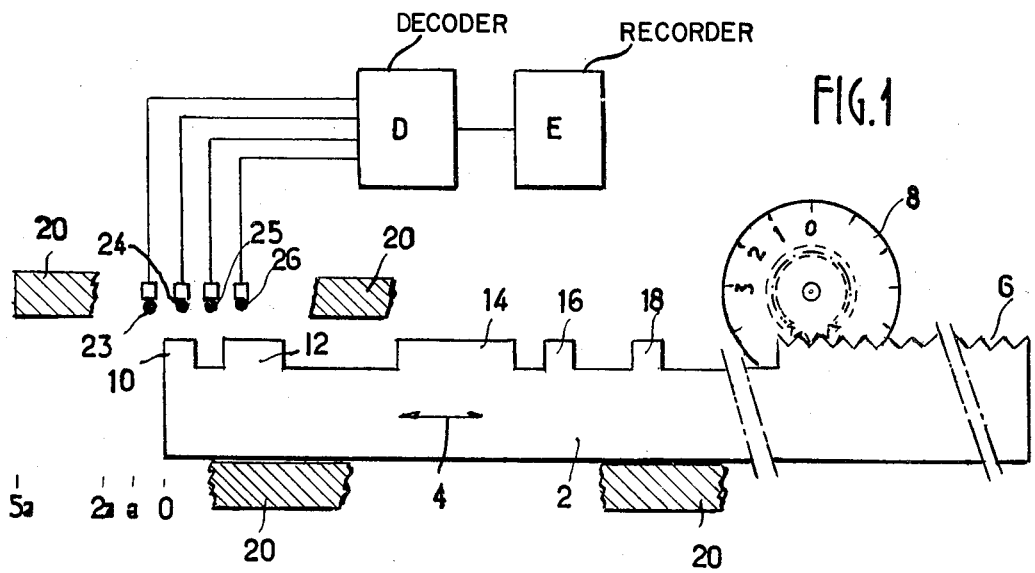
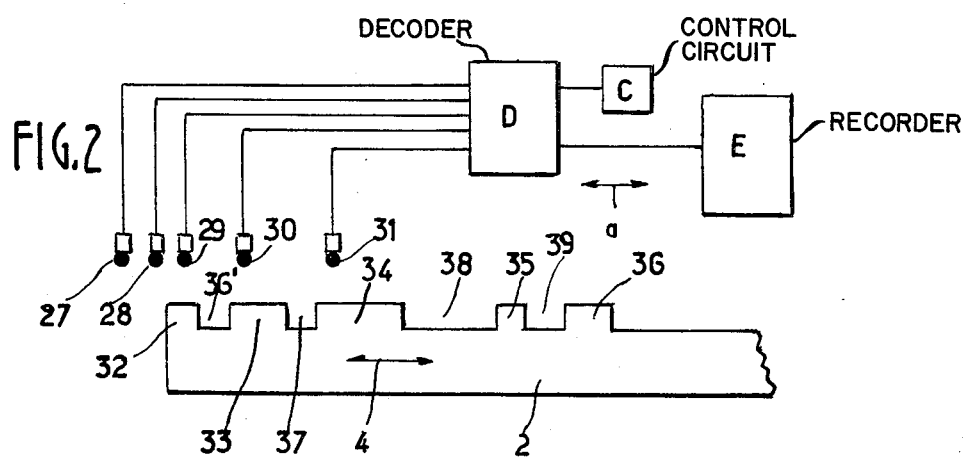
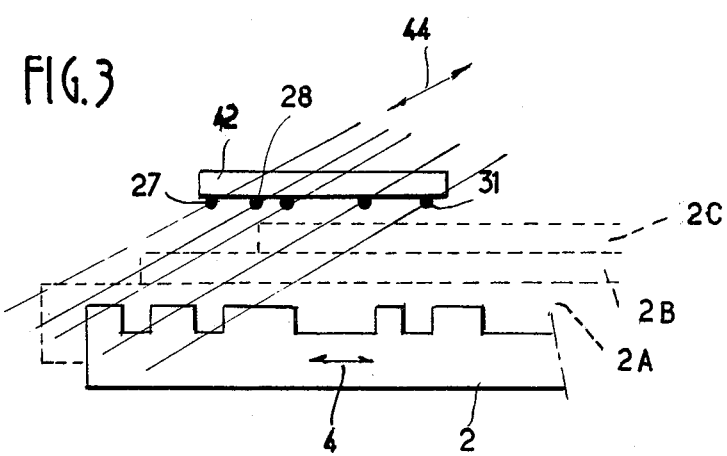

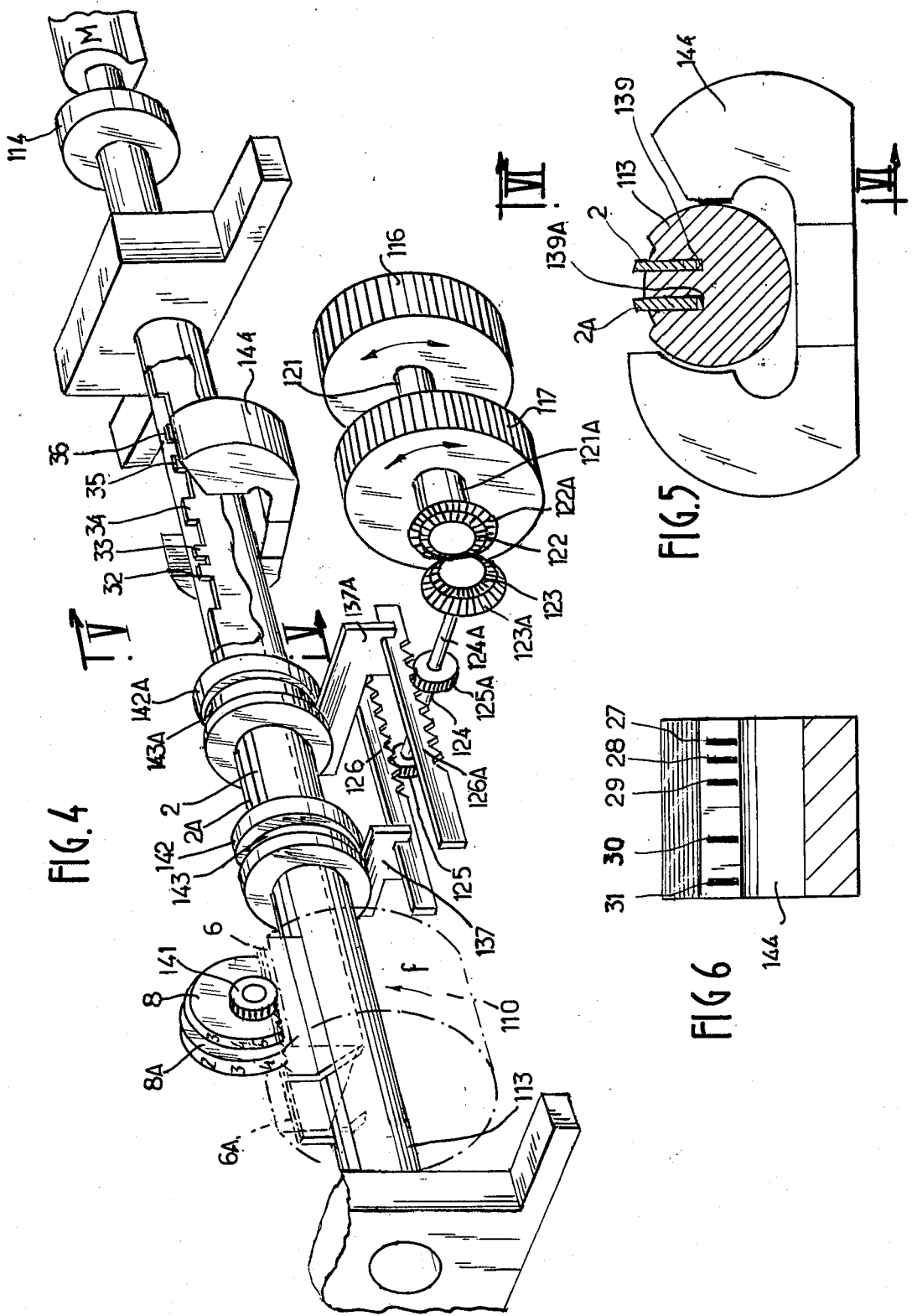

DEVICE FOR LOCATING THE POSITION OF A MOVABLE COMPONENT AND ESPECIALLY A VALUE-SETTING COMPONENT IN A FRANKING MACHINE

This invention relates to a device for locating the position of a movable component with respect to a stationary frame, said movable component being capable of occupying N distinct positions each representing an increment a.

The invention is more particularly applicable to the position-location of a movable component which carries out a movement of linear displacement but also applies to circular displacements, in which case the movable component describes a circle sector and carries out complete movements of rotation.

The invention finds a particularly advantageous application in the case of franking machines with electronic recording in which the value-setting of the franking means is performed by sliding members which are capable of occupying ten positions. The position of these sliding members is representative of the numerical value set by the user and is transmitted to an electronic integrating counter in the form of electrical signals. A franking machine of this type comprising an electronic integrating counter was described in French patent Application No. 75 37 911 filed on Dec. 11, 1975 corresponding to U.S. application Ser. No. 746,712 Dec. 2, 1976, now U.S. Pat. No. 4,090,063.

Devices are already known for locating the position of a movable component and making use of two-state transducers which are influenced by the proximity of an index carried by the movable component or by an element which is rigidly fixed to said movable component.

Thus in the patent application cited above, there was described a position-locating system of the "1 out of 10" type for locating the position of a sliding member having ten distinct positions. The system comprised ten detecting transducers and an activating device carried by the sliding member. The transducer which was activated therefore determined the position of the sliding member with absolute accuracy but the system was relatively cumbersome and entailed the need for ten connecting leads plus a common lead.

This gave rise to a disadvantage, especially in the case of franking machines in which it is necessary to record four different orders of magnitude, for example: units, tens, hundreds, thousands, thus entailing the need to accommodate four sliding members together with their position-locating system within a small space.

Systems are also known for position-location by counting, for example by counting the movement of transfer of slits on a strip or on a disc by means of a photoelectric transducer. This is the system of position-locating by incremental transducer but this system has a disadvantage in that a starting reference is required. If the counting operation has been interrupted for any reason, the system must be returned to the reference position before measuring further displacements. A system of this type is therefore not absolute and does not achieve the degree of operational safety which is necessary in certain types of machines and especially franking machines.

Angular orders are also known and could be employed for the position-location of components in translational motion. These angular orders call for a bank of n transducers for locating $2^n$ positions, these transducers being aligned in a direction perpendicular to the movement. The movable component accordingly carries coded activation zones (for example opaque zones and transparent zones in the case of photoelectric transducers), thus making it possible to obtain absolute coded position-location. However, the overall size of the system is substantial in the direction at right angles to the displacement and it would not be possible to accommodate four identical systems for example within a volume which is acceptable for the equipment of a franking machine.

The device in accordance with the present invention makes it possible to overcome the different disadvantages mentioned in the foregoing.

The device in fact makes it possible to obtain an absolute coded position-location which calls neither for counting nor for a reference base; the code is binary; the number n of transducers is of a low order and always much smaller than the number N of different positions to be located; and the transducers are disposed in a line parallel to the displacements to be measured, thus resulting in an assembly which takes up little space.

The invention is directed to a device for locating the position of one or a number of movable components among N incremental positions each having an increment a wherein: a number $n<N$ of two-state transducers are disposed in one row in the vicinity of the movable component in a line parallel to the displacement of said movable component; the number n of transducers is such that $2^n \geq N$; the transducers are separated by intervals which are equal to multiples of a; the movable component is provided with a plurality of separate zones of activation of the transducers, said zones being aligned in a direction parallel to the displacement of the movable component; said activation zones are disposed so as to have a pitch which is a multiple of a and the intervals between said zones have lengths which are multiples of a; and n transducers are connected to a decoding circuit for collecting a coded signal having n bits which is different for each position of the movable component.

In a preferred embodiment, the locating operation is applied to one out of ten distinct positions, especially in the case of location of the position of value-setting components in a franking machine. In this case, provision is made for five transducers which deliver five-bit coded information, that is to say information which is superabundant for the position-location but which makes it possible to check the accuracy of the information collected by the transducers.

In the event that the device is applied to the position-location of a plurality of movable components such as, for example, the sliding members of the value-setting system in a franking machine, a single set of transducers is employed in one row and means are provided for producing a relative exploratory displacement of the single row of transducers with respect to the movable components in a direction at right angles to that of the displacement of said movable components. Thus said single row of transducers successively scans the activation zones carried by the movable components.

A more complete understanding of the invention will be gained from the following description and from the accompanying drawings which are given solely by way of example, and in which:

FIG. 1 is a schematic diagram of one embodiment of the invention;

FIG. 2 is a schematic diagram of an alternative embodiment for checking the accuracy of information supplied by the transducers;

FIG. 3 illustrates diagrammatically another embodiment in which the positions of a plurality of movable components can be located by means of a single row of transducers;

FIG. 4 is a view in perspective illustrating the application of the embodiment of FIG. 3 to the position-location of value-setting sliding members in a franking machine, position-locating of all the sliding members being carried out by means of a single set of transducers;

FIG. 5 is a sectional view taken along line V—V of FIG. 4;

FIG. 6 is a view in elevation showing the single set of transducers, this view being taken along the line VI—VI of FIG. 5.

There is shown diagrammatically in FIG. 1 a movable component or sliding member 2 which is capable of moving in increments having a value a in linear displacement in the direction 4 so as to occupy N distinct positions with respect to the stationary frame 20 of the machine.

By way of example, the sliding member aforesaid forms part of a franking machine and drives a printing wheel 8 by means of a toothed rack 6.

Provision is made in the vicinity of the sliding member 2 for n transducers which may be four in number, for example, and are disposed parallel to the direction of displacement 4. Said transducers are designated by the references 23-24-25-26 and are relatively spaced at intervals equal to the increment a or to a multiple of a. In the example illustrated, the four transducers are also spaced at intervals of a. However, in other forms of construction which are not shown in the drawings, the intervals between the transducers could be different from each other on condition that they are multiples of a. The transducers are carried by the stationary frame 20 of the machine.

In accordance with the invention, the number of transducers is always smaller than the number N of positions to be located but this number is always at least equal to a value n such that:

$$2^n \geq N$$

As will hereinafter become apparent, the system shown in FIG. 1 serves to locate N=16 distinct positions by means of n=4 transducers ($2^4 = 16$).

It is readily apparent that, in the case of a franking machine, position-location must be carried out between only ten positions (decimal system), with the result that six of the possible positions would be unused but it must be clearly understood that the arrangement of FIG. 1 is given solely as a simple example of construction.

The transducers 23-24-25-26 are two-state detecting transducers which are influenced by activation zones 10-12-14-16-18 carried by the sliding member 2.

In a device according to the invention, it is possible to employ any desired type of transducer for detecting a proximity or a contact, the activation zones being chosen as a function of the type of transducer.

Thus it is possible to employ:

photoelectric transducers which cooperate either by reflection or transmission with reflecting or opaque and transparent activation zones;

magnetic transducers which cooperate with magnetic crests carried by the sliding member;

inductive, capacitive or fluidic transducers;

transducers of the contact type, direct type or of the type without lamps.

In order to simplify the description, consideration will hereinafter be given solely to magnetic transducers which are influenced by "teeth" or "crests" such as those designated by the references 10 to 18 which are cut in the sliding member 2 so as to form projecting portions. It will be clearly understood, however, that the activation zones are not necessarily projecting zones and likewise that the non-activation zones are not necessarily recessed zones. Provision could be made by way of example for different materials (different magnetism, conductivity or opacity) so that the sliding member is not provided physically with recessed or projecting portions.

The crests or more generally the activation zones carried by the movable component each have a length of influence equal to the increment a or to a multiple of a.

Thus in the example of FIG. 1, the crests 10-16 and 18 have a length of influence a, the crest 12=2a, the crest 14=4a. Similarly, the intervals or non-activation zones also have a "non-influence" length of a or a multiple of a (intervals between 10-12 and 14-16=a, interval between 16-18=2a, interval between 12-14=4a).

Depending on the intervals chosen between the transducers, the position and number of the projecting crests and recesses formed on the movable component can be other than those shown in FIG. 1.

If it is considered in accordance with the binary code that a non-activated transducer is in state 0 and that a transducer activated by a crest is in state 1, the code indicated in Table I given below is obtained in respect of each of the sixteen possible positions:

TABLE I

| Displacement | Transd. 23 | Transd. 24 | Transd. 25 | Transd. 26 | Code |
|---|---|---|---|---|---|
| 0 | 0 | 1 | 0 | 1 | 0101 |
| a | 1 | 0 | 1 | 1 | 1011 |
| 2a | 0 | 1 | 1 | 0 | 0110 |
| 3a | 1 | 1 | 0 | 0 | 1100 |
| 4a | 1 | 0 | 0 | 0 | 1000 |
| 5a | 0 | 0 | 0 | 0 | 0000 |
| 6a | 0 | 0 | 0 | 1 | 0001 |
| 7a | 0 | 0 | 1 | 1 | 0011 |
| 8a | 0 | 1 | 1 | 1 | 0111 |
| 9a | 1 | 1 | 1 | 1 | 1111 |
| 10a | 1 | 1 | 1 | 0 | 1110 |
| 11a | 1 | 1 | 0 | 1 | 1101 |
| 12a | 1 | 0 | 1 | 0 | 1010 |
| 13a | 0 | 1 | 0 | 0 | 0100 |
| 14a | 1 | 0 | 0 | 1 | 1001 |
| 15a | 0 | 0 | 1 | 0 | 0010 |

The coded 4-bit data supplied by the four transducers are transmitted to a decoder D which transmits them to a recorder E or a similar device for processing the data of the machine.

It is clearly shown in Table I that the position-location obtained is absolute, each of the sixteen positions being such as to correspond to a single coded 4-bit datum without repetitions or omissions, this result being obtained with a minimum number of transducers which are aligned parallel to the displacement of the movable component to be position-located.

It has been mentioned in the foregoing that the "crests" or equivalent activation zones were carried directly by the movable component or in other words by the sliding member 2 but it is readily apparent that these zones can be carried by another component such as a rod or the like which is coupled mechanically to the movable component to be located.

The embodiment shown in FIG. 2 is more especially applicable to the position-location of a movable component in a franking machine which is capable of occupying ten distinct positions. The movable component is again a sliding member 2 which is capable of linear displacement in the direction 4.

In accordance with the invention, only four transducers would be necessary in order to define ten positions with an absolute code but, in this embodiment, five transducers 27-28-29-30-31 have been chosen. These transducers are again aligned parallel to the displacement of the movable component and with intervals between transducers which are equal to the increment a or to a multiple of a.

In the embodiment chosen, the intervals considered from the transducer 27 are successively as follows:

a,a,2a,3a

The sliding member has five activation zones or crests 32-33-34-35-36 which all have a length of influence equal to a or to a multiple of a. Starting from the first crest 32, these lengths of influence are successively equal in the example to:

a,2a,3a,a,2a

The non-activation or recessed zones located between the crests also have lengths which are multiples of the increment a. In the example shown in FIG. 2, these lengths considered from the first recess 36 are successively as follows:

a,a,3a,a

It is clearly apparent that the step-by-step advance of the sliding member 2 by a unitary value a produces in the row of transducers a binary code which is a function of the position. Table II given below shows the coded data obtained in respect of each of the ten positions of the sliding member.

In this case also, the position-location is absolute but it is apparent that superabundant information is provided by means of the fifth transducer whereas only four transducers would be sufficient.

In accordance with this preferred embodiment of the invention, the positioning of the transducers as well as the positioning of the crests and recessed portions in the sliding member are chosen so as to ensure that the code corresponding to each position always contains three identical bits such as, for example, three "1" states as can be seen from the Table given hereunder.

By associating a control circuit C with the decoder D, it is thus possible to ensure that no coded information is erroneous, thus providing an additional safety feature.

In a franking machine, it is usually necessary to locate the positions of four movable components or sliding members corresponding to the orders of magnitude 1, 10, 100, 1000.

There are shown diagrammatically in FIG. 3 four parallel sliding members 2-2A-2B-2C which cooperate with a single row of transducers 27-28 . . . 31 carried by a common bar 42. In order to record the positions of the four sliding members in sequence, it is only necessary to scan the bar 42 in the direction 44 in proximity to the crests of the four sliding members. Conversely, the four sliding members can be carried by an element which is capable of moving in rotation, for example, in order to cause the crests and the recesses to pass in proximity to the transducers.

In FIG. 4, the basic components of a franking machine are shown in order to illustrate the application of the device in accordance with the invention to the position-location of the sliding members of the value-setting system of the machine.

As in the case of many conventional franking machines, the machine which is illustrated to a partial extent in the figure comprises a printing drum shown diagrammatically in chain-dotted lines at 110. Said drum carries stationary printing elements and variable printing elements which are all etched in relief. Among the variable printing elements, there is shown only a wheel 8 for printing the units of the prepayment or franking values and a wheel 8A for printing the tens. It is readily apparent that the machine comprises a number of other printing wheels such as, for example, two additional wheels for printing the hundreds and the thousands respectively. The printing wheels are rotatably mounted within the drum 110 and this latter is keyed on a rotary shaft 113 which is driven in the direction of the arrow f so as to make one revolution during each franking operation by means of a special clutch of conventional type as generally designated by the reference 114.

Two manual control knobs 116, 117 permit the respective value-setting of two printing wheels 8, 8A by means of suitable transmission systems.

The transmission system which couples the control knob 116 to the printing wheel 8 comprises a shaft 121 which is rigidly fixed to the control knob 116, a bevel pinion 122 keyed on the shaft 121, another bevel pinion 123 disposed in mesh with the pinion 122 and keyed on a shaft 124, a pinion 125 keyed on the shaft 124, a toothed rack 126 in mesh with the pinion 125, a support bracket 137 which is rigidly fixed to the toothed rack 126, a ring 142 which is capable of sliding on the shaft 113 and has an annular channel 143 in which is engaged

TABLE II

| Displacement | Transd. 27 | Transd. 28 | Transd. 29 | Transd. 30 | Transd. 31 | Code |
|---|---|---|---|---|---|---|
| 0 | 0 | 0 | 1 | 1 | 1 | 00111 |
| a | 0 | 1 | 0 | 1 | 1 | 01011 |
| 2a | 1 | 0 | 1 | 0 | 1 | 10101 |
| 3a | 0 | 1 | 1 | 1 | 0 | 01110 |
| 4a | 1 | 1 | 0 | 1 | 0 | 11010 |
| 5a | 1 | 0 | 1 | 1 | 0 | 10110 |
| 6a | 0 | 1 | 1 | 0 | 1 | 01101 |
| 7a | 1 | 1 | 1 | 0 | 0 | 11100 |
| 8a | 1 | 1 | 0 | 0 | 1 | 11001 |
| 9a | 1 | 0 | 0 | 1 | 1 | 10011 | the support bracket 137, a rod or sliding member 2 which is capable of sliding within a longitudinal groove 139 of the shaft 113, a toothed rack 6 rigidly fixed to the sliding member 2 and a pinion 141 disposed in meshing engagement with the toothed rack 6 and rigidly fixed to the printing wheel 8.

The transmission system which couples the value-setting knob 117 to the printing wheel 8A is similar to the system which has just been described for the value-setting of the printing wheel 8. The corresponding components are designated by the same reference numerals to which is assigned the index "A".

The machine is equipped with a coding system for reading the instantaneous position of each sliding member or rod.

Thus the sliding member 2 carries five teeth 32, 33, 34, 35, 36 and the sliding member 2A similarly carries five teeth 32A, 33A, 34A, 35A, 36A (as in the case of FIGS. 2 and 3). The corresponding teeth of the two sliding members 2 and 2A are aligned in the same plane which is transverse to the shaft 113 in respect of one and the same value which is displayed on the printing wheels 8 and 8A. Five transducers are suitably arranged in rows parallel to the shaft 113 and consist, for example, of five magnetoresistive cells 27, 28, 29, 30, 31, said cells being integrated in a common fixed magnetic circuit 144 which extends over the entire length of the useful travel of the teeth. The magnetic circuit 144 through which a flux passes continuously is constituted by a permanent magnet, for example.

When the machine is in its position of rest as shown in FIGS. 4 and 5, the shaft 113 occupies the angular position in which none of the teeth mentioned above is present in front of the magnetoresistive cells. During operation, the movement of rotation of the shaft 113 causes a certain number of teeth to pass in front of a certain number of magnetoresistive cells. In point of fact, magnetoresistive cells have the property of setting-up a resistance to the electric current, said resistance being variable as a function of the magnetic flux which surrounds said cells. Thus the cells which are located opposite to teeth undergo variations in resistance. These variations are utilized in electronic circuits in order to permit counting of the value which has been displayed by means of the control knobs 116 and 117 and which will be printed on envelopes or wrappers by means of the printing wheels 8 and 8A. In fact, each of the ten positions of the sliding members 2, 2A is identified by means of the code supplied by said position in accordance with Table II.

There has been described in the foregoing the position-location of a component which is displaceable in translational motion but it is wholly apparent that the invention also applies to the angular location of components which are displaceable in rotational motion.

It can also be readily understood that the values which have been given for the spacing of the transducers and for the arrangement of the crests and recesses carried by the movable component are only examples and that many other arrangements could produce identical results.

Finally, it must be clearly understood from the statement made earlier to the effect that the length of an activation zone is equal to a multiple of a, that this is in fact the length of influence of said zone. It can accordingly prove an advantage in practice to make provision for crests of smaller width than a in order to prevent any influence from being exerted on adjacent transducers. In all cases, however, the "pitch" of the activation zones is always equal to a multiple of a. From this it follows that, in the case of the crest 14 (shown in FIG. 1) which has a length of influence of 4a, it would be equally possible to form this activation zone by means of four successive narrow crests or peaks separated from each other by recesses, the "pitch" of these four narrow crests being equal to a.

It is readily apparent that the invention is not limited to the embodiments herein described with reference to the accompanying drawings and, depending on the applications which are contemplated, permits of many alternative forms within the capacity of anyone versed in the art without thereby departing either from the scope or the spirit of the invention.

We claim:

1. A franking machine comprising a rotary franking drum having an axially extending shaft, means for driving said drum through said shaft in such a manner that said drum effects during each cycle of franking operation a full revolution from a rest position of the drum, a plurality of individual printing wheels rotatable relative to said drum and movable therewith about said shaft in a common direction of rotation, a manually operable mechanism for setting the postage value required to be printed by said printing wheels, and a device for producing electric signals representative of the angular printing position taken by each printing wheel in accordance with the selected postal value to be printed, said device comprising:

(a) a plurality of elongated parallel elements (2) mounted on said shaft (113) for rotation therewith and also for lengthwise sliding motion relative thereto so that said elements are longitudinally shiftable through N incremental positions having an increment a and corresponding to the different angular printing positions of the printing wheels (8), each element being provided with a plurality of longitudinally spaced activating zones (10, 12, 14, 16, 18) the length and the mutual spacing of which are equal to a or multiple thereof and each printing wheel being so operatively associated with one of said elements, respectively, that when the printing wheel is rotated through said setting mechanism to any selected angular printing position, the associated element is shifted precisely to that one of said incremental positions thereof which corresponds to the selected angular printing position of the printing wheel; and (b) a single row of n<N stationary two-state transducers (such as 23, 24, 25, 26) spaced apart by intervals which are equal to a or multiple thereof, said row extending in parallelism with said shaft and at such radial distance therefrom as to permit said activating zones of the elongated elements to pass during each franking cycle past said row of transducers the number n of which is such that $2^n \geq N$." wherein each printing wheel is mounted for rotational movement to any one of ten different printing positions, wherein each elongated element is provided with five activating zones, and wherein the single transducer row includes five transducers, the five activating zones being so disposed in respect to the five transducers that in each incremental position of the elongated elements, three of said five zones are capable of activating respectively three of said five transducers in accordance with a decimal digit self-checking code.

* * * * *

UNITED STATES PATENT OFFICE
CERTIFICATE OF CORRECTION

Patent No. 4,224,603      Dated September 23, 1980

Inventor(s) Jacques Lallemand

It is certified that error appears in the above-identified patent and that said Letters Patent are hereby corrected as shown below:

Col. 1, lines 65 and 67, cancel "orders" and substitute -- coders -- .

Signed and Sealed this

Twenty-seventh Day of January 1981

[SEAL]

Attest:

RENE D. TEGTMEYER

Attesting Officer      Acting Commissioner of Patents and Trademarks